US012643161B2

(12) United States Patent
Kuroda

(10) Patent No.: US 12,643,161 B2
(45) Date of Patent: Jun. 2, 2026

(54) ROTARY TOOL AND METHOD FOR MANUFACTURING MACHINED PRODUCT

(71) Applicant: KYOCERA CORPORATION, Kyoto (JP)

(72) Inventor: Masahiko Kuroda, Higashiomi (JP)

(73) Assignee: KYOCERA CORPORATION, Kyoto (JP)

( * ) Notice: Subject to any disclaimer, the term of this patent is extended or adjusted under 35 U.S.C. 154(b) by 406 days.

(21) Appl. No.: 18/574,042

(22) PCT Filed: Jul. 1, 2022

(86) PCT No.: PCT/JP2022/026441
§ 371 (c)(1),
(2) Date: Dec. 25, 2023

(87) PCT Pub. No.: WO2023/277176
PCT Pub. Date: Jan. 5, 2023

(65) Prior Publication Data
US 2024/0286208 A1 Aug. 29, 2024

(30) Foreign Application Priority Data

Jul. 1, 2021 (JP) .................................. 2021-110206

(51) Int. Cl.
*B23C 5/10* (2006.01)

(52) U.S. Cl.
CPC .......... *B23C 5/10* (2013.01); *B23C 2210/082* (2013.01); *B23C 2210/084* (2013.01); *B23C 2210/54* (2013.01); *Y10T 409/303752* (2015.01)

(58) Field of Classification Search
CPC ... B23C 5/10; B23C 2200/32; B23C 2200/36; B23C 2210/04; B23C 2210/08;
(Continued)

(56) References Cited

U.S. PATENT DOCUMENTS

| 9,901,995 B2 * | 2/2018 | Baba ......................... B23C 5/10 |
| 10,131,003 B2 * | 11/2018 | Shpigelman .............. B23C 5/10 |

(Continued)

FOREIGN PATENT DOCUMENTS

| CN | 101977714 A | 2/2011 | |
| EP | 2848342 B1 * | 6/2018 | .............. B23C 5/10 |

(Continued)

*Primary Examiner* — Sunil K Singh
*Assistant Examiner* — Michael Vitale
(74) *Attorney, Agent, or Firm* — HAUPTMAN HAM, LLP

(57) ABSTRACT

A rotary tool may include a body extending from a front end toward a rear end. The body may include a tip cutting edge, a corner cutting edge, an outer peripheral cutting edge, a first rake surface, a second rake surface, and a third rake surface. The corner cutting edge may extend from the tip cutting edge toward an outer periphery. The outer peripheral cutting edge may extend from the corner cutting edge toward the rear end. The first rake surface may be located along the tip cutting edge. The second rake surface may be located along the corner cutting edge. The first rake surface may have a straight line shape in a cross section orthogonal to the tip cutting edge, and the second rake surface may have a concave shape in a cross section orthogonal to the corner cutting edge.

11 Claims, 10 Drawing Sheets

(58) Field of Classification Search
CPC ........ B23C 2210/082; B23C 2210/084; B23C
2210/086; B23C 2210/202; B23C
2210/282; B23C 2210/486; B23C
2210/54; Y10T 407/23; Y10T 407/235;
Y10T 407/24; Y10T 407/245; Y10T
409/303752; Y10T 409/303808
USPC .......... 407/113, 114, 115, 116; 409/131, 132
See application file for complete search history.

(56) References Cited

U.S. PATENT DOCUMENTS

2006/0060053 A1* 3/2006 Tanaka .................... B23C 5/109
83/663
2009/0245946 A1* 10/2009 Maeda ...................... B23C 5/10
407/32

| | | | | |
|---|---|---|---|---|
| 2010/0143052 A1* | 6/2010 | Aoki | .......................... | B23C 5/10 |
| | | | | 407/54 |
| 2011/0008112 A1 | 1/2011 | Abe | | |
| 2014/0205390 A1* | 7/2014 | Baba | .......................... | B23C 5/10 |
| | | | | 407/54 |
| 2014/0341662 A1* | 11/2014 | Yamayose | ................. | B23C 5/10 |
| | | | | 407/54 |
| 2017/0341162 A1* | 11/2017 | Watanabe | ................. | B23C 5/10 |
| 2020/0254539 A1* | 8/2020 | Sharivker | ................. | B23C 5/10 |
| 2023/0133391 A1* | 5/2023 | Sharivker | ................. | B23C 5/10 |
| | | | | 407/53 |

FOREIGN PATENT DOCUMENTS

| | | | | | |
|---|---|---|---|---|---|
| JP | 2006212744 A | * | 8/2006 | .............. | B23C 5/10 |
| JP | 2011020192 A | | 2/2011 | | |
| JP | 6477015 B2 | * | 3/2019 | | |
| JP | 2021010957 A | * | 2/2021 | | |
| WO | WO-2019188135 A1 | * | 10/2019 | .............. | B23C 5/16 |

* cited by examiner

ROTARY TOOL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2022/026441 filed on Jul. 1, 2022, which claims priority to Japanese Patent Application No. 2021-110206, filed Jul. 1, 2021. The contents of this application are incorporated herein by reference in their entirety.

TECHNICAL FIELD

The present disclosure may relate to a rotary tool used for a milling process of a workpiece, and a method for manufacturing a machined product.

BACKGROUND

An end mill is discussed in, for example, Japanese Unexamined Patent Publication No. 2011-020192 (Patent Document 1) as a rotary tool used for a milling process of a workpiece, such as metal. The end mill discussed in Patent Document 1 may include a bottom cutting edge, a corner cutting edge, an outer peripheral cutting edge, a rake surface, and a gash surface. In Patent Document 1, the rake surface may correspond to surfaces illustrated by "a rake surface 9a of a first bottom cutting edge," "a rake surface 10 of the outer peripheral cutting edge," and "a rake surface 11 of the corner cutting edge," and these surfaces may be individually illustrated in a straight line shape in a cross-sectional view of a cutting edge. The gash surface may correspond to a surface illustrated by "a rake surface 9b of a second bottom cutting edge," and may extend from the bottom cutting edge toward a rear end.

In the rotary tool discussed in Patent Document 1, chips generated by the bottom cutting edge and the outer peripheral cutting edge may collide with each other, and chip clogging may occur. Hence, there is a desire for a rotary tool less prone to chip clogging.

SUMMARY

A rotary tool in a non-limiting embodiment aspect of the present disclosure may include a body having a columnar shape extending from a front end toward a rear end along a rotation axis. The body may include a tip cutting edge having a straight line shape, a corner cutting edge having a convex curvilinear shape, an outer peripheral cutting edge, a first rake surface, a second rake surface, a third rake surface, a gash surface that is flat, and a flute. The tip cutting edge may be located on a side of the front end. The corner cutting edge may extend from the tip cutting edge toward an outer periphery. The outer peripheral cutting edge may extend from the corner cutting edge toward the rear end. The first rake surface may be located along the tip cutting edge. The second rake surface may be located along the corner cutting edge. The third rake surface may be located along the outer peripheral cutting edge. The gash surface may extend from the first rake surface toward the rear end. The flute may extend from the gash surface, the second rake surface, and the third rake surface toward the rear end. The first rake surface may have a straight line shape in a cross section orthogonal to the tip cutting edge, and the second rake surface may have a concave shape in a cross section orthogonal to the corner cutting edge.

EMBODIMENTS

Figure 1:
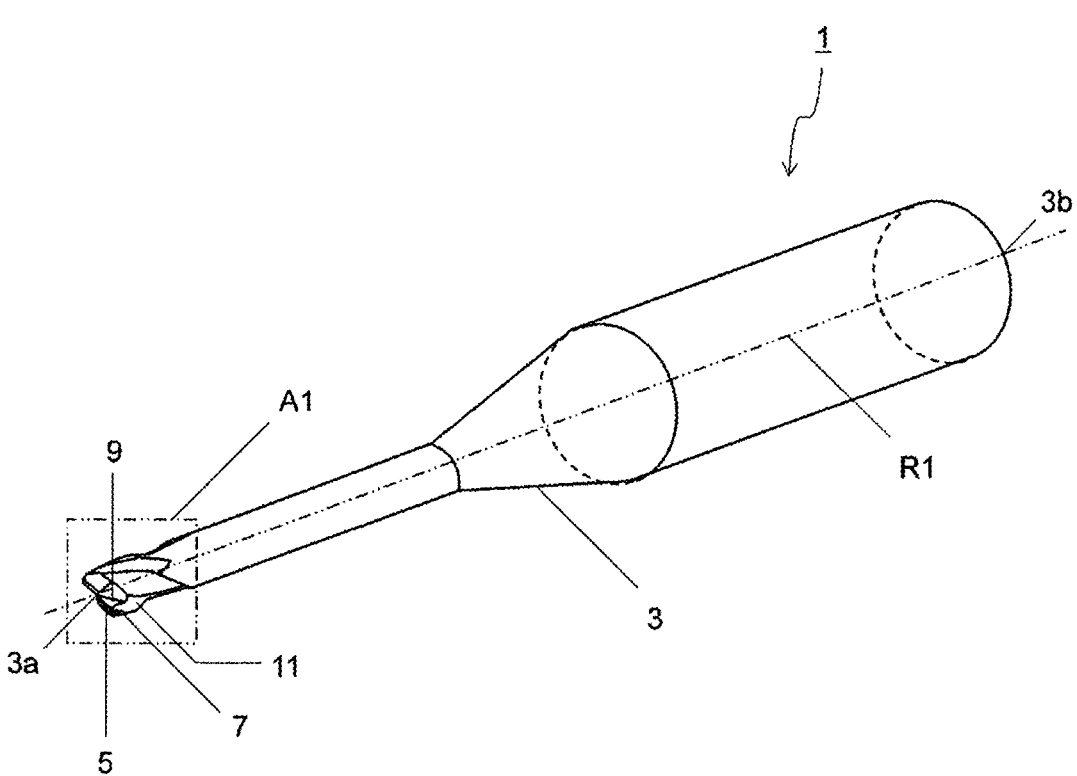
FIG. 1 is a perspective view illustrating a rotary tool in a non-limiting embodiment.

A rotary tool 1 in a non-limiting embodiment may be described in detail with reference to the drawings. Examples of the rotary tool may include end mills and milling cutters. Examples of the end mills may include square end mills, radius end mills, and flat end mills. The rotary tool 1 in the non-limiting embodiment illustrated in FIG. 1 may be a radius end mill.

For convenience of description, the drawings referred to in the following may illustrate, in simplified form, only main members in members constituting non-limiting embodiments. The rotary tool may therefore include any arbitrary structural member not illustrated in the drawings referred to in the present specification. Dimensions of the members in each of the drawings may faithfully represent neither dimensions of actual structural members nor dimensional ratios of these members. These are also true for a method for manufacturing a machined product 101 described later.

The rotary tool 1 in the non-limiting embodiment illustrated in FIG. 1 may include a body 3 extending from a first end 3a to a second end 3b along a rotation axis R1. The first end may be called "a front end," and the second end may be called "a rear end." The first end 3a and the second end 3b may be respectively called "the front end 3a" and "the rear end 3b" in some cases. The body 3 may be rotatable around the rotation axis R1 in a direction of an arrow R2 during a machining process of a workpiece for manufacturing the machined product 101 as in the non-limiting embodiment illustrated in FIGS. 1 and 3.

The body 3 in the non-limiting embodiment illustrated in FIG. 1 may be a so-called solid tool formed by a single member. However, the body 3 is not limited to one which has the above configuration, but may be formed by a plurality of members. For example, the body 3 may be formed by a holder and an insert.

In the non-limiting embodiment illustrated in FIG. 1, an end part of the body 3 on a lower left side may be the first end 3a, and an end part on an upper right side may be the second end 3b. An end part of the body 3 on a left side may be the first end 3a, and an end part on a right side may be the second end 3b in a non-limiting embodiment illustrated in FIGS. 4 to 7.

Figure 3:
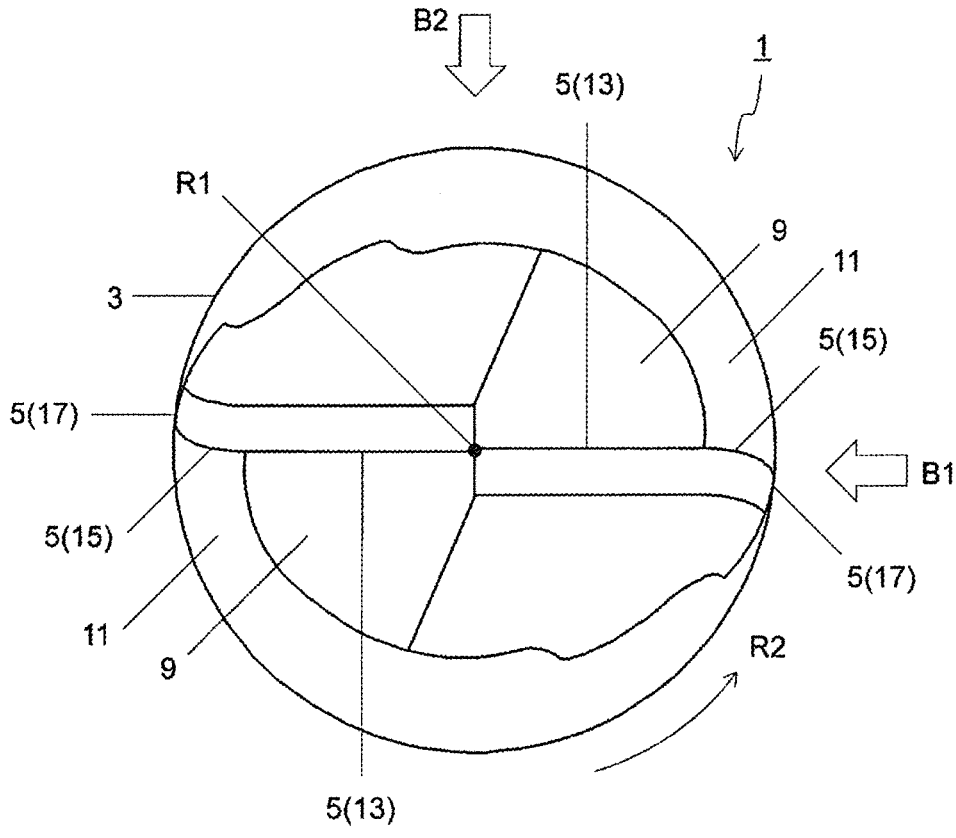
FIG. 3 is a plan view of the rotary tool illustrated in FIG. 1 as viewed from a side of a front end.
Figure 4:
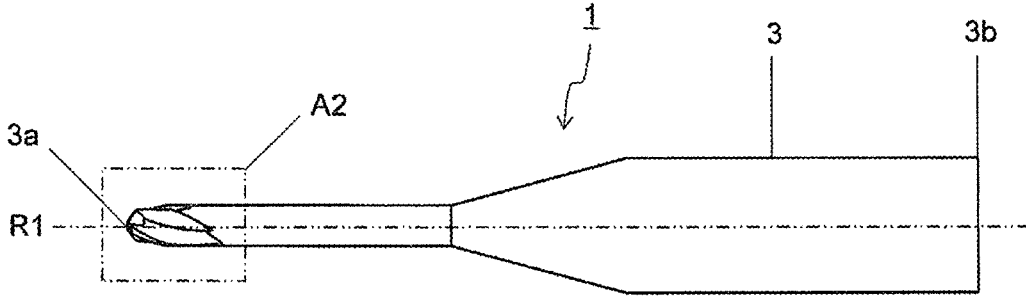
FIG. 4 is a side view of the rotary tool illustrated in FIG. 3 as viewed from B1 direction.
Figure 5:
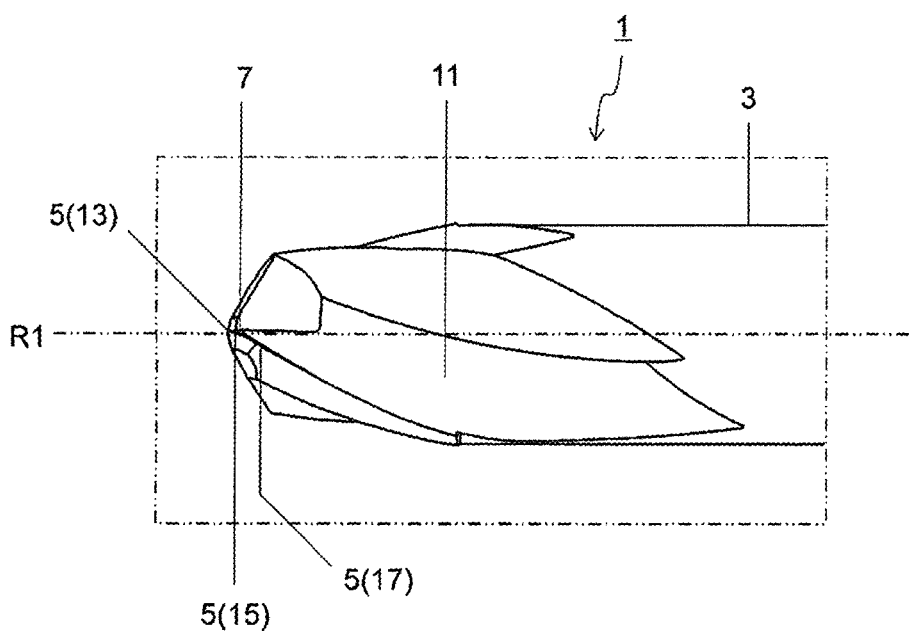
FIG. 5 is an enlarged view of a region A2 illustrated in FIG. 4.
Figure 6:
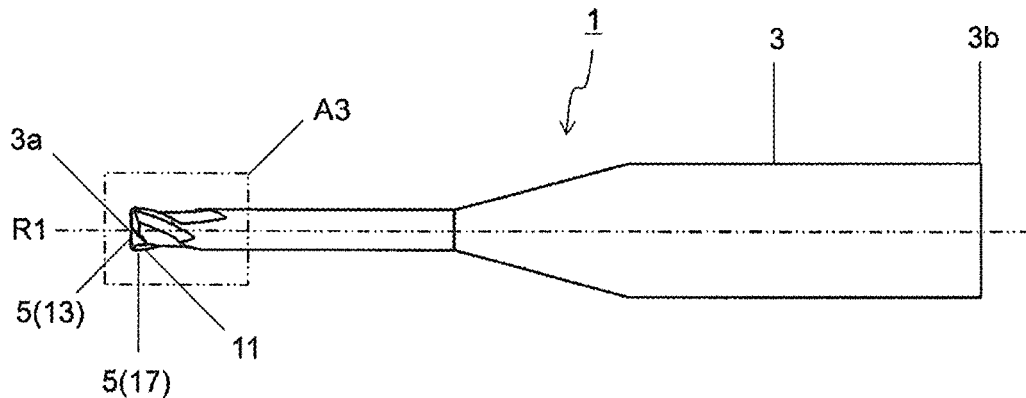
FIG. 6 is a side view of the rotary tool illustrated in FIG. 3 as viewed from B2 direction.
Figure 7:
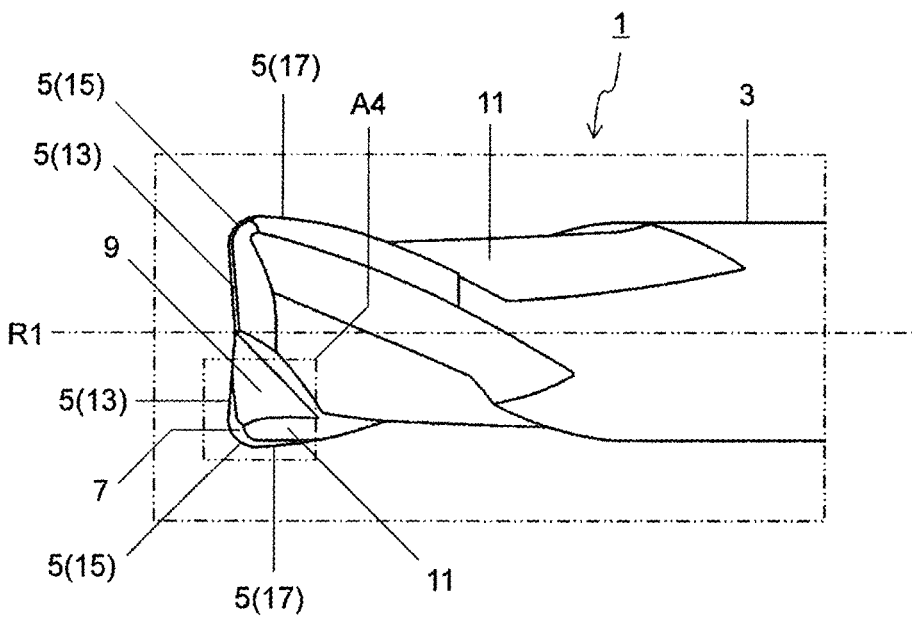
FIG. 7 is an enlarged view of a region A3 illustrated in FIG. 6.

FIGS. 6 and 7 may be diagrams illustrating a state where the rotary tool 1 illustrated in FIGS. 4 and 5 is rotated at a predetermined angle in a rotation direction R2. FIG. 4 may be a diagram of the rotary tool 1 illustrated in FIG. 3 as viewed from B1 direction. FIG. 6 may be a diagram of the rotary tool 1 illustrated in FIG. 3 as viewed from B2 direction. FIG. 6 may be a diagram as viewed from a direction shifted 90° with respect to FIG. 4.

The body 3 in the non-limiting embodiment illustrated in FIG. 1 may have a columnar shape. The term "columnar shape" as used herein is not limited to a strict column. For example, a flute 11 that permits flow of chips as described later may be disposed on an outer periphery of the body 3.

An outer diameter D of the body 3 may be set to, for example, 4-25 mm. A length of the body 3 in a direction along the rotation axis R1 may be represented by the letter "L." A relationship between L and D may be set to, for example, L=4D to 15D. In this case, the outer diameter of the body 3 may be constant or changed from a side of the front end 3a to a side of the rear end 3b. For example, the outer diameter of the body 3 may decrease from the side of the front end 3a to the side of the rear end 3b.

The body 3 may include a cutting edge 5, a rake surface 7, a gash surface 9, and the flute 11.

Figure 2:
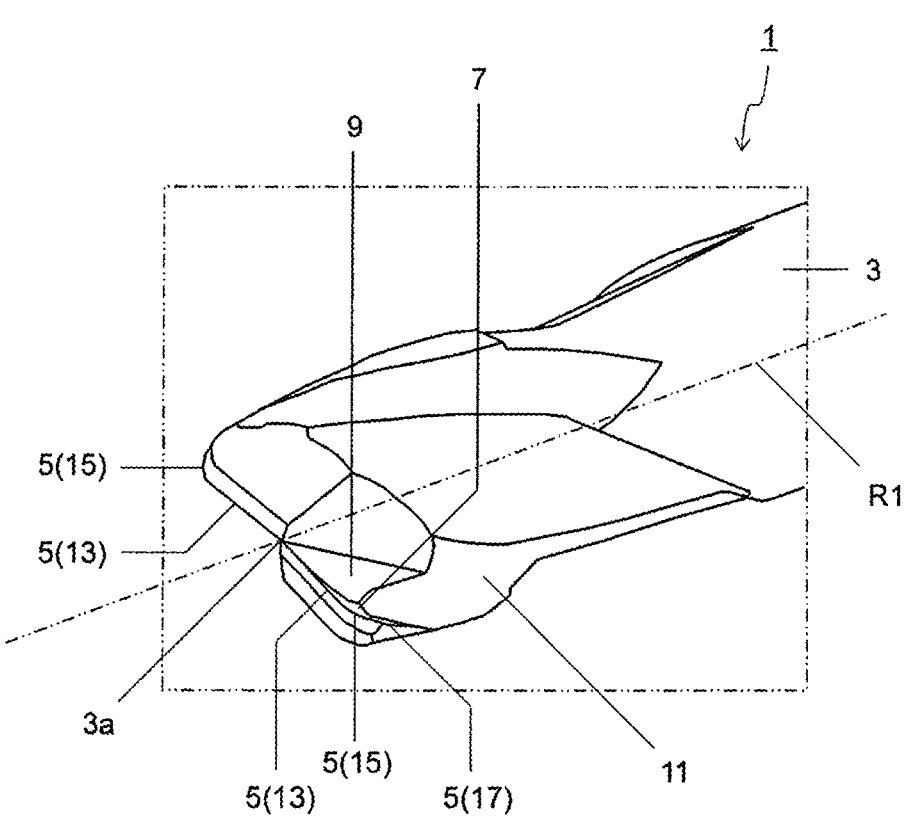
FIG. 2 is an enlarged view of a region A1 illustrated in FIG. 1.

The cutting edge 5 may include a tip cutting edge 13, a corner cutting edge 15, and an outer peripheral cutting edge 17 as in the non-limiting embodiment illustrated in FIGS. 2 and 3. The cutting edge 5 may include one or a plurality of each of the tip cutting edge 13, the corner cutting edge 15, and the outer peripheral cutting edge 17. The rotary tool 1 in the non-limiting embodiment illustrated in FIG. 2 may include two of each of the tip cutting edges 13, the corner cutting edge 15, and the outer peripheral cutting edge 17. The plurality of tip cutting edges 13, corner cutting edges 15, and outer peripheral cutting edges 17 may have 180° rotational symmetry around the central axis R1 in the rotary tool 1 of the non-limiting embodiment illustrated in FIG. 3. Therefore, each one for the plurality of tip cutting edges 13, corner cutting edges 15, and outer peripheral cutting edges 17 may be described below.

The corner cutting edge 15 may be a part of the cutting edge 5 which is located on a side of the front end 3a and on an outer peripheral side in the body 3. The corner cutting edge 15 may have a convex curvilinear shape. The corner cutting edge 15 having the convex curvilinear shape may have constant curvature. That is, the corner cutting edge 15 may have a circular arc shape. The corner cutting edge 15 having the convex curvilinear shape may not have constant curvature. If the corner cutting edge 15 has the circular arc shape, the corner cutting edge 15 may have high durability.

The tip cutting edge 13 may be a part of the cutting edge 5 which is located on a side of the front end 3a in the body 3. The tip cutting edge 13 may have a straight line shape. The term "straight line shape" as used herein is not limited to a strict straight line. The tip cutting edge 13 may include unevenness of approximately several tens of μm, which is unavoidable, for example, in a manufacturing process. A radius of curvature of the tip cutting edge 13 may be approximately several tens of times larger than a radius of curvature of the corner cutting edge 15 so as to have a gentle curvilinear shape that can be regarded as a straight line shape.

The tip cutting edge 13 may connect to the corner cutting edge 15, and may extend from the corner cutting edge 15 toward the rotation axis R1. In other words, the corner cutting edge 15 may extend from the tip cutting edge 13 toward the outer periphery of the body 3. The tip cutting edge 13 may be orthogonal to the rotation axis R1, or may be inclined with respect to the rotation axis R1 in a side view. The tip cutting edge 13 may be inclined with respect to the rotation axis R1 so as to come closer to the rear end 3b as going away from the rotation axis R1. As in a non-limiting embodiment illustrated in FIG. 7, the tip cutting edge 13 may be inclined with respect to the rotation axis R1 so as to come closer to the rear end 3b as coming closer to the rotation axis R1.

If the tip cutting edge 13 is orthogonal to the rotation axis R1, the whole of the tip cutting edge 13 may be usable as a so-called flat cutting edge. If the tip cutting edge 13 is inclined with respect to the rotation axis R1 so as to come closer to the rear end 3b as going away from the rotation axis R1, a cutting edge angle can be made small and, therefore, it is possible to enhance a feed rate. If the tip cutting edge 13 is inclined with respect to the rotation axis R1 so as to come closer to the rear end 3b as coming closer to the rotation axis R1, it is possible to carry out a so-called ramping process.

The outer peripheral cutting edge 17 may be a part located on the outer periphery of the body 3. The outer peripheral cutting edge 17 may connect to the corner cutting edge 15, and may extend from the corner cutting edge 15 toward the rear end 3b. The outer peripheral cutting edge 17 may have a straight line shape, or may have a helical shape that extends toward a rear side in the rotation direction R2 as going away from the corner cutting edge 15.

The rake surface 7 may be located along the cutting edge 5. The rake surface 7 may be a surface that permits frictional flow of chips generated by the cutting edge 5, and may be a surface for controlling chip shape, chip flow velocity and chip flow direction. The rake surface 7 may connect to or be away from the cutting edge 5. For example, if a so-called land surface connects to the cutting edge 5 in order to enhance strength of the cutting edge 5, the rake surface 7 may connect to the cutting edge 5 with the land surface interposed therebetween.

Figure 8:
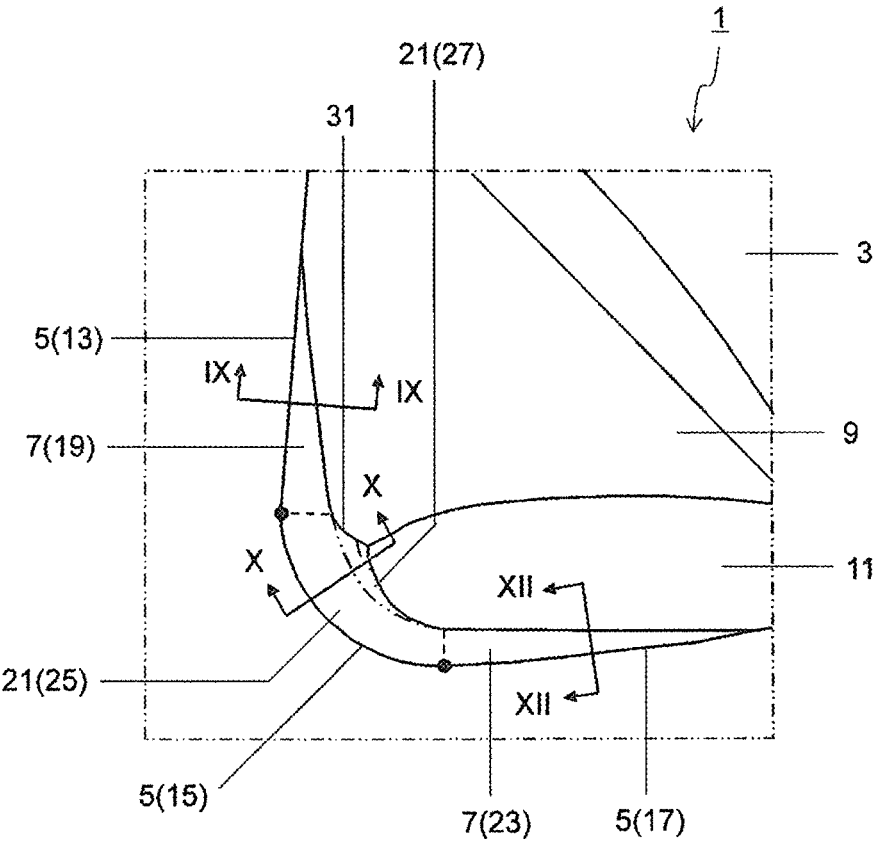
FIG. 8 is an enlarged view of a region A4 illustrated in FIG. 7.

The rake surface 7 may include a first rake surface 19, a second rake surface 21, and a third rake surface 23 as in a non-limiting embodiment illustrated in FIG. 8. The first rake surface 19 may be located along the tip cutting edge 13. The second rake surface 21 may be located along the corner cutting edge 15. The third rake surface 23 may be located along the outer peripheral cutting edge 17.

Figure 9:
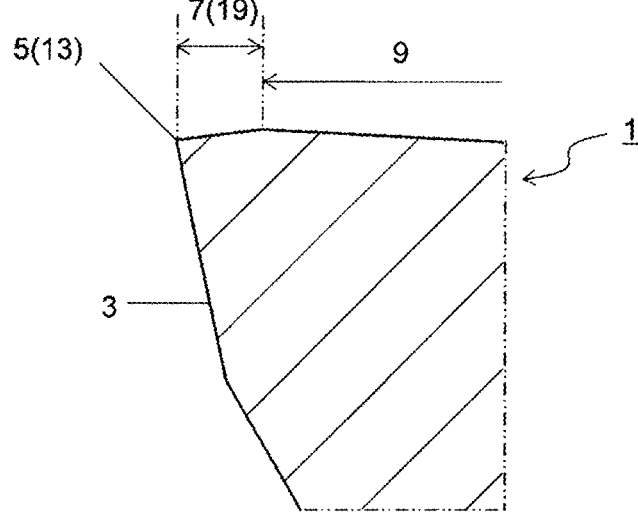
FIG. 9 is a sectional view of a cross section taken along the line IX-IX in the rotary tool illustrated in FIG. 8.

The first rake surface 19 located along the tip cutting edge 13 may have a straight line shape in a cross section orthogonal to the tip cutting edge 13 as in a non-limiting embodiment illustrated in FIG. 9. For example, if the first rake surface 19 is flat, the first rake surface 19 can have a straight line shape in the cross section orthogonal to the tip cutting edge 13. The second rake surface 21 located along the corner cutting edge 15 may have a concave shape in a cross section orthogonal to the corner cutting edge 15 as in a non-limiting embodiment illustrated in FIGS. 10 and 11. For example, if the second rake surface 21 has a concave surface shape, the second rake surface 21 can have the concave shape in the cross section orthogonal to the corner cutting edge 15.

Chips generated by the tip cutting edge 13 may tend to flow over the first rake surface 19 and go ahead toward a direction orthogonal to the tip cutting edge 13. Chips generated by the corner cutting edge 15 may tend to flow over the second rake surface 21 and go ahead toward a direction orthogonal to the corner cutting edge 15. Therefore, the chips generated by the tip cutting edge 13 and the chips generated by the corner cutting edge 15 may collide with each other to cause chip clogging.

However, if the second rake surface 21 has the concave shape in the cross section orthogonal to the corner cutting edge 15, a flow direction of the chips generated by the corner cutting edge 15 may tend to become a direction away from the chips generated by the tip cutting edge 13 on the second rake surface 21. Consequently, chip clogging may less be likely to occur.

Because the tip cutting edge 13 is located on a more inner side than the corner cutting edge 15, a rotation speed of the tip cutting edge 13 may be lower than a rotation speed of the corner cutting edge 15. Therefore, a flow velocity of the chips generated by the tip cutting edge 13 may be lower than a flow velocity of the chips generated by the corner cutting edge 15. If the first rake surface 19 has the straight line shape in the cross section orthogonal to the tip cutting edge 13, it is possible to reduce the probability that the flow of the chips generated by the tip cutting edge 13 is excessively blocked on the first rake surface 19. Therefore, it is possible to reduce the probability that the chips generated by the tip cutting edge 13 cause clogging.

The shape of the second rake surface 21 in a cross section orthogonal to the corner cutting edge 15 is not limited to a specific configuration. For example, the second rake surface 21 may be made up of two parts each having a straight line shape or a single part having a concave curvilinear shape in the cross section orthogonal to the corner cutting edge 15.

A rake angle of the first rake surface 19 is not limited to a specific value, but may be a negative value as in a non-limiting embodiment illustrated in FIG. 9. The phrase that "the rake angle is the negative value" as used herein may mean that the rake surface 7 is inclined so as to be located on a front side in the rotation direction R2 as going away from the cutting edge 5. An upper side in the non-limiting embodiment illustrated in FIG. 9 may correspond to the front side of the rotation direction R2, and the first rake surface 19 may be inclined upward as going away from the tip cutting edge 13.

Figure 10:
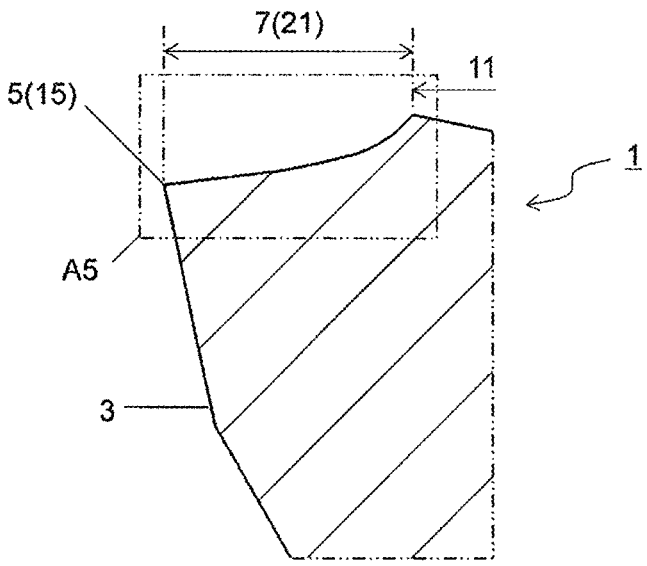
FIG. 10 is a sectional view of a cross section taken along the line X-X in the rotary tool illustrated in FIG. 8.

A rake angle of the second rake surface 21 is not limited to a specific value, but may be a negative value as in a non-limiting embodiment illustrated in FIG. 10. An upper side in the non-limiting embodiment illustrated in FIG. 10 may correspond to the front side of the rotation direction R2, and the second rake surface 21 may be inclined upward as going away from the corner cutting edge 15. In cases where the rake surface 7 is curved like the second rake surface 21 in the present embodiment, the rake angle may be evaluated by a tangent line at an end part that is in contact with the cutting edge 5 on the rake surface 7.

Figure 12:
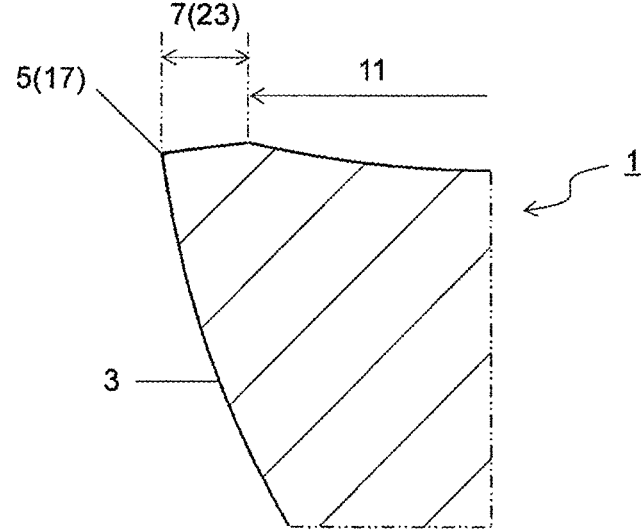
FIG. 12 is a sectional view of a cross section taken along the line XII-XII in the rotary tool illustrated in FIG. 8.

A rake angle of the third rake surface 23 is not limited to a specific value, but may be a negative value as in a non-limiting embodiment illustrated in FIG. 12. An upper side in the non-limiting embodiment illustrated in FIG. 12 may correspond to the front side of the rotation direction R2, and the third rake surface 23 may be inclined upward as going away from the outer peripheral cutting edge 17.

Figure 11:
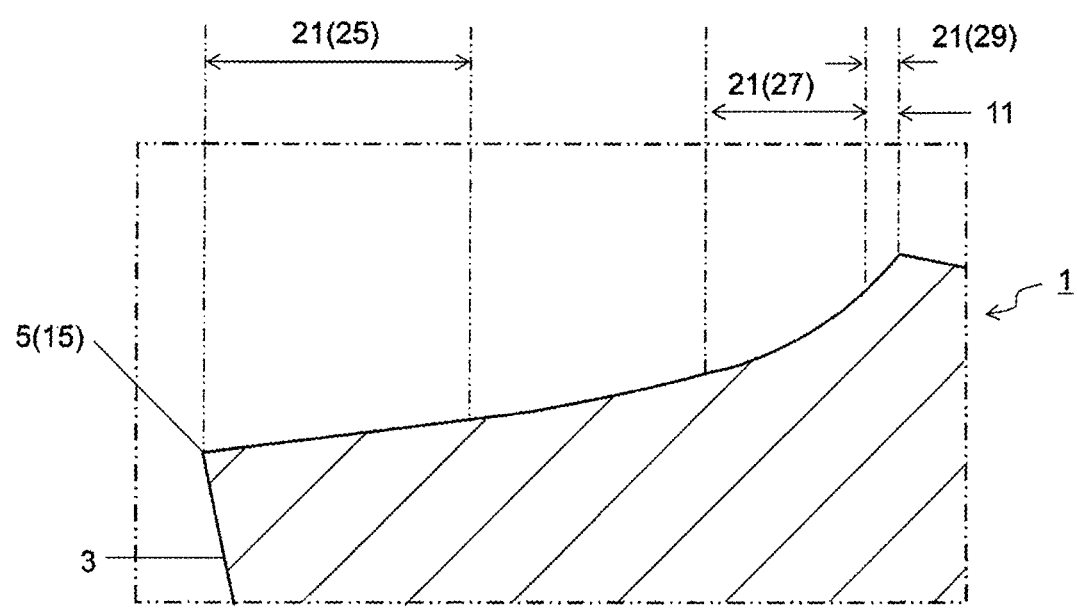
FIG. 11 is an enlarged view of a region A5 illustrated in FIG. 10.

The second rake surface 21 having the concave shape in the cross section orthogonal to the corner cutting edge 15 may include a first part 25 and a second part 27 as in a non-limiting embodiment illustrated in FIG. 11. The first part 25 may be the part extending from the corner cutting edge 15, and the second part 27 may be the part extending from the first part 25. Specifically, the first part 25 may be the part located along the corner cutting edge 15, and the second part 27 may be the part located closer to the rotation axis R1 than the first part 25.

The first part 25 may have a straight line shape, and the second part 27 may have a concave curvilinear shape in the cross section orthogonal to the corner cutting edge 15. If the first part 25 has the straight line shape, it is possible to smoothly move ahead the chips generated by the corner cutting edge 5 to the second rake surface 21. If the second part 27 has the concave curvilinear shape, a flow direction of the chips generated by the corner cutting edge 15 may tend to become a direction away from the chips generated by the tip cutting edge 13 on the second rake surface 21 as described above.

If the second rake surface 21 includes the first part 25 and the second part 27 which respectively have the above-mentioned shapes, it is possible to reduce the probability of chip clogging due to collision between the chips generated by the corner cutting edge 15 and the chips generated by the tip cutting edge 13, while reducing chip clogging on the second rake surface 21.

The second rake surface 21 may further include a third part 29 in addition to the first part 25 and the second part 27 in the cross section orthogonal to the corner cutting edge 15 as in the non-limiting embodiment illustrated in FIG. 11. The third part 29 may be the part extending from the second part 27. Specifically, the third part 29 may be the part located along the second part 27 at a location closer to the rotation axis R1 than the second part 27.

The third part 29 may have a straight line shape in the cross section orthogonal to the corner cutting edge 15. If the third part 29 has the straight line shape, a flow direction of chips whose flow direction is changed at the second part 27 may tend to become stable.

Consequently, it is possible to further reduce the probability of the chip clogging due to the collision between the chips generated by the corner cutting edge 15 and the chips generated by the tip cutting edge 13.

If the second rake surface 21 includes the first part 25 and the third part 29 each having the straight line shape in the cross section orthogonal to the corner cutting edge 15, an angle formed by the first part 25 and the third part 29 may be an obtuse angle. This can further reduce the probability of the chip clogging on the second rake surface 21.

In cases where the second rake surface 21 includes the first part 25 and the second part 27 in the cross section orthogonal to the corner cutting edge 15, the first part 25 may connect to the first rake surface 19 and the third rake surface 23, and the second part 27 may be located away from the first rake surface 19 and the third rake surface 23 as in the non-limiting embodiment illustrated in FIG. 8.

If the second part 27 having the concave curvilinear shape is located away from the first rake surface 19 that is flat, a difference in level may less be likely to occur at a boundary between the first rake surface 19 and the second rake surface 21. Therefore, it is possible to reduce the probability that the chips generated by the corner cutting edge 15 and the chips generated by the tip cutting edge 13 get caught in the difference in level.

If the second part 27 having the concave curvilinear shape is located away from the third rake surface 23 that is flat, a difference in level may less be likely to occur at a boundary between the second rake surface 21 and the third rake surface 23. Therefore, it is possible to reduce the probability that the chips generated by the corner cutting edge 15 and the chips generated by the outer peripheral cutting edge 17 get caught on the difference in level.

A width of the first part 25 in a direction orthogonal to the corner cutting edge 15 may become smaller as going away from the first rake surface 19. The rotary tool 1 may rotate around the rotation axis R1 in a machining process of a workpiece. Consequently, a flow of chips generated by a portion located near the tip cutting edge 13 in the corner cutting edge 15 may tend to be slower than a flow of chips generated by a portion located near the outer peripheral cutting edge 17 in the corner cutting edge 15, and may tend to become unstable.

As described above, the first part 25 having the straight line shape may be servable to smoothly move ahead the chips generated by the corner cutting edge 15 to the second rake surface 21. Therefore, if the width of the first part 25 in the direction orthogonal to the corner cutting edge 15 is configured as described above, it is possible to enhance the function of guiding chips by the corner cutting edge 15 as a whole.

The gash surface 9 may extend from the first rake surface 19 toward the rear end 3b. The gash surface 9 may be the surface for reducing a web thickness of the body 3 on a side of the front end 3a, and may have a flat shape. Because the gash surface 9 may be the surface for reducing the web thickness of the body 3 on a side of the front end 3a, a part of the gash surface 9 may be located in a region closer to the rotation axis R1 than the rake surface 7 as in the non-limiting embodiment illustrated in FIG. 7.

The gash surface 9 may extend from the second rake surface 21 toward the rear end 3b. In other words, the second rake surface 21 may connect to the gash surface 9. In this case, a ridgeline 31 corresponding to a boundary between the second rake surface 21 and the gash surface 9 may be protruded toward the second rake surface 21 as in the non-limiting embodiment illustrated in FIG. 8.

In this case, chips generated by the tip cutting edge 13 and passed through the first rake surface 19 to the gash surface 9 may less be likely to flow onto the second rake surface 21. This can further reduce the probability of the chip clogging due to the collision between the chips generated by the corner cutting edge 15 and the chips generated by the tip cutting edge 13.

Specifically, the ridgeline 31 corresponding to the boundary between the second rake surface 21 and the gash surface 9 may have a curvilinear shape protruded toward the second rake surface 21. In this case, the ridgeline 31 corresponding to the boundary between the second rake surface 21 and the gash surface 9 may come closer to the rear end 3b as coming closer to the outer periphery of the body 3.

This can furthermore reduce the probability of the chip clogging due to the collision between the chips generated by the corner cutting edge 15 and the chips generated by the tip cutting edge 13. From the viewpoint of reducing the probability of the chip clogging, the whole of the ridgeline 31 corresponding to the boundary between the second rake surface 21 and the gash surface 9 may come closer to the rear end 3b as coming closer to the outer periphery of the body 3.

The third rake surface 23 located along the outer peripheral cutting edge 17 may have a straight line shape in the cross section orthogonal to the outer peripheral cutting edge 17 as in the non-limiting embodiment illustrated in FIG. 12. For example, if the third rake surface 23 is flat, the third rake surface 23 can have the straight line shape in the cross section orthogonal to the outer peripheral cutting edge 17.

The width of the first rake surface 19 in the direction orthogonal to the tip cutting edge 13 may become smaller as going away from the second rake surface 21. A part located away from the second rake surface 21 in the tip cutting edge 13 may have a lower rotation speed than a part located near the second rake surface 21. Accordingly, the part located away from the second rake surface 21 in the tip cutting edge 13 may tend to have poor cutting performance.

However, if the width of the first rake surface 19 in the direction orthogonal to the tip cutting edge 13 is configured as described above, it may be easy to reduce deterioration of the cutting performance at the part located away from the second rake surface 21 in the tip cutting edge 13, while maintaining durability of the tip cutting edge 13 as a whole. Therefore, it is possible to enhance the cutting performance of the tip cutting edge 13 as a whole. Particularly in cases where the rake angle of the first rake surface 19 is the negative value as in the non-limiting embodiment illustrated in FIG. 9, the above-mentioned effects may tend to become marked.

A width of the third rake surface 23 in a direction orthogonal to the outer peripheral cutting edge 17 may become smaller as going away from the second rake surface 21. A part located near the second rake surface 21 in the outer peripheral cutting edge 17 may be more susceptible to a large cutting load than a part located away from the second rake surface 21.

If the width of the third rake surface 23 in the direction orthogonal to the outer peripheral cutting edge 17 is configured as described above, it may be easy to enhance durability at the part located near the second rake surface 21 in the outer peripheral cutting edge 17, while maintaining cutting performance of the outer peripheral cutting edge 17 as a whole. Therefore, it is possible to enhance the durability of the outer peripheral cutting edge 17 as a whole. Particularly in cases where the rake angle of the third rake surface 23 is the negative value as in the non-limiting embodiment illustrated in FIG. 12, the above-mentioned effects may tend to become marked.

The flute 11 may extend from the gash surface 9, the second rake surface 21, and the third rake surface 23 toward the rear end 3b. The flute 11 may connect to the first rake surface 19, or may be located away from the first rake surface 19. The flute 11 may serve to flow chips generated by the cutting edge 5 toward the rear end 3b so as to discharge the chips to the outside.

The flute 11 may extend straight out toward the rotation axis R1, or may have a helical shape extending toward a rear side in the rotation direction R2 as going toward the rear end 3b. If the flute 11 has the helical shape, an angle formed by the flute 11 with respect to the rotation axis R1 in a side view may be a so-called helix angle. The helix angle of the flute 11 is not limited to a specific value, but may be settable to, for example, 5-60°. However, the helix angle may be constant or changed.

The flute 11 may extend toward the rear end 3b of the body 3, but may not reach the rear end 3b. In other words, the flute 11 may be located away from the rear end 3*b* of the body 3. If the flute 11 is located away from the rear end 3*b* of the body 3, a part closer to the rear end 3*b* of the body 3 than the flute 11 may be a so-called shank. A part extending from the front end 3*a* of the body 3 to a rear end of the flute 11 in a direction along the rotation axis R1, in other words, a part on a side of the front end 3*a* with respect to the shank may be a so-called cutting part.

The rotary tool 1 in the non-limiting embodiment illustrated in FIG. 1 may be a tool used in right rotation, and therefore, the outer peripheral cutting edge 17 and the flute 11 may be right helix. However, the rotary tool 1 is not limited thereto. For example, there is no problem even if the rotary tool 1 is a tool used in left rotation and the outer peripheral cutting edge 17 and the flute 11 may be left helix.

For example, cemented carbide and cermet may be usable as a material of the body 3. Examples of composition of the cemented carbide may include WC—Co, WC—TiC—Co and WC—TiC—TaC—Co, in which WC, TiC and TaC may be hard particles, and Co may be a binding phase. The cermet may be a sintered composite material obtainable by compositing metal into a ceramic component. Examples of the cermet may include titanium compounds composed mainly of titanium carbide (TiC) or titanium nitride (TiN).

A surface of the body 3 may be coated with a coating film by using chemical vapor deposition (CVD) method or physical vapor deposition (PVD) method. Examples of composition of the coating film may include titanium carbide (Tic), titanium nitride (TiN), titanium carbonitride (TiCN), and alumina ($Al_2O_3$). A thickness of the coating film may be set to, for example, 0.3-20 μm. A suitable range may differ depending on the composition of the coating film.

While the rotary tools 1 of the plurality of embodiments have been exemplified above, the present disclosure is not limited thereto. Needless to say, it is possible to make any arbitrary one without departing from the scope of the present disclosure.

<Method for Manufacturing Machined Product>

Figure 13:
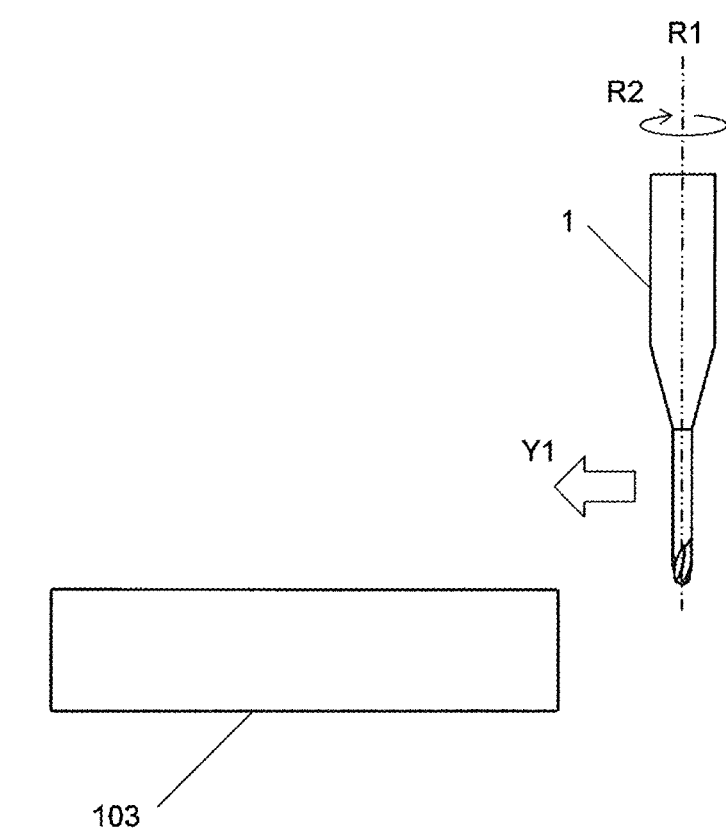
FIG. 13 is a schematic diagram illustrating one of steps in a method for manufacturing a machined product in a non-limiting embodiment.
Figure 14:
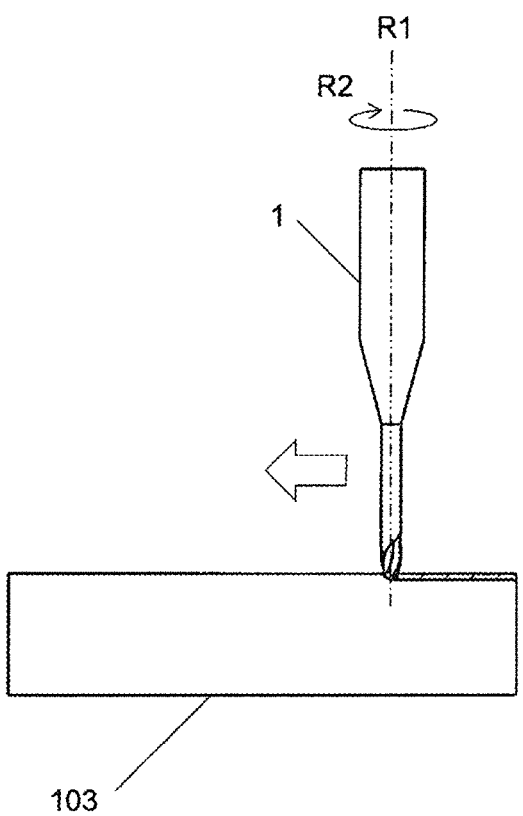
FIG. 14 is a schematic diagram illustrating one of the steps in the method for manufacturing the machined product in the non-limiting embodiment.
Figure 15:
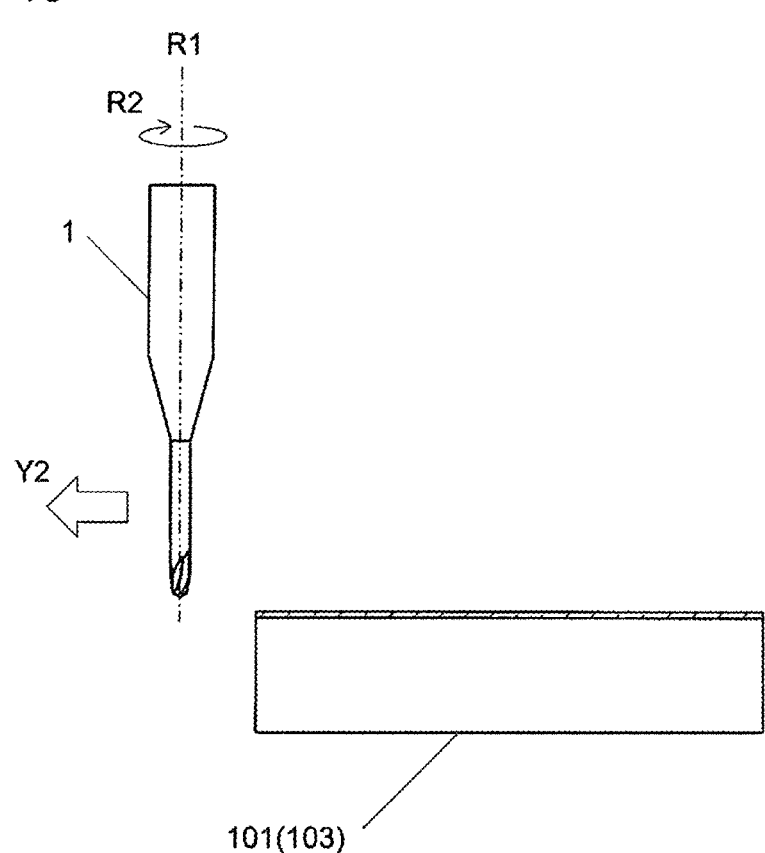
FIG. 15 is a schematic diagram illustrating one of the steps in the method for manufacturing the machined product in the non-limiting embodiment.

A method for manufacturing a machined product in a non-limiting embodiment may be described in detail below by exemplifying the case of using the rotary tool 1 in the above non-limiting embodiment with reference to FIGS. 13 to 15. FIGS. 13 to 15 may illustrate the steps of a milling process of a workpiece 103 as an embodiment of the method for manufacturing the machined product 101. In order to facilitate visual understanding, hatching may be applied to a cut part in FIGS. 14 and 15.

The method for manufacturing the machined product 101 in the non-limiting embodiment may include the following steps (1) to (3).

(1) The rotary tool 1 may be brought near the workpiece 103 in Y1 direction by rotating the rotary tool 1 in a direction of an arrow R2 around the rotation axis R1 (refer to FIG. 13).

This step may be carried out, for example, by fixing the workpiece 103 onto a table of machine tool with the rotary tool 1 attached thereto, and by bringing the rotary tool 1 being rotated near the workpiece 103. However, in this step, the workpiece 103 and the rotary tool 1 may be brought near each other, and the workpiece 103 may be brought near the rotary tool 1.

(2) The rotary tool 1 being rotated may be brought into contact with a desired position on a surface of the workpiece 103 so as to cut out the workpiece 103 by causing the rotary tool 1 to come further closer to the workpiece 103 (refer to FIG. 14).

In this step, the tip cutting edge 13, the corner cutting edge 15, and the outer peripheral cutting edge 17 may be brought into contact with the desired position on the surface of the workpiece 103.

(3) The rotary tool 1 may be moved away from the workpiece 103 in a direction of Y2 (refer to FIG. 15).

Also in this step, similarly to the above step (1), the rotary tool 1 may be relatively moved away from the workpiece 103. For example, the workpiece 103 may be moved away from the rotary tool 1. Examples of the machining process may include plunge milling, profile milling, and ramping process, in addition to the milling process as in the non-limiting embodiment illustrated in FIG. 15.

It is possible to offer excellent machinability by going through the foregoing steps.

In cases where the machining process of the workpiece 103 as described above is carried out a plurality of times, specifically, a plurality of machining processes of a single workpiece 103 may be carried out, the step of bringing the rotary tool 1 into contact with different portions of the workpiece 103 may be repeated while keeping the rotary tool 1 rotated.

The invention claimed is:

1. A rotary tool, comprising:

a body having a columnar shape extending from a front end of the body toward a rear end of the body along a rotation axis, wherein the body comprises:

a tip cutting edge having a straight line shape located on a side of the front end, a corner cutting edge having a convex curvilinear shape extending from the tip cutting edge toward an outer periphery of the body, an outer peripheral cutting edge extending from the corner cutting edge toward the rear end, a first rake surface located along the tip cutting edge, a second rake surface located along the corner cutting edge, a third rake surface located along the outer peripheral cutting edge, a gash surface that is flat and that extends from the first rake surface toward the rear end, and a flute extending from each of the gash surface, the second rake surface, and the third rake surface toward the rear end, wherein the first rake surface has a straight line shape in a cross section orthogonal to the tip cutting edge, and the second rake surface has a concave shape in a cross section orthogonal to the corner cutting edge.

2. The rotary tool according to claim 1, wherein, in the cross section orthogonal to the corner cutting edge, the second rake surface comprises;

a first part having a straight line shape extending from the corner cutting edge, and a second part having a concave curvilinear shape extending from the first part.

3. The rotary tool according to claim 2, wherein, in the cross section orthogonal to the corner cutting edge, the second rake surface further comprises;

a third part having a straight line shape extending from the second part.

4. The rotary tool according to claim 3, wherein an angle formed by the first part and by the third part is an obtuse angle.

5. The rotary tool according to claim 2, wherein the first part connects to the first rake surface and to the third rake surface, and the second part is located away from each of the first rake surface and the third rake surface.

6. The rotary tool according to claim 2, wherein a width of the first part in a direction orthogonal to the corner cutting edge decreases as a distance from the first rake surface increases.

7. The rotary tool according to claim 1, wherein the second rake surface connects to the gash surface, and a ridgeline, which corresponds to a boundary between the second rake surface and the gash surface, is shaped so as to protrude toward the second rake surface.

8. The rotary tool according to claim 1, wherein a width of the first rake surface in a direction orthogonal to the tip cutting edge decreases as a distance from the second rake surface increases.

9. The rotary tool according to claim 1, wherein a width of the third rake surface in a direction orthogonal to the outer peripheral cutting edge decreases as a distance from the second rake surface increases.

10. The rotary tool according to claim 1, wherein the rotary tool is an end mill.

11. A method for manufacturing a machined product from a workpiece with the rotary tool according to claim 1, the method comprising:

providing the rotary tool according to claim 1;

rotating the rotary tool about the rotation axis;

bringing the rotary tool being rotated into contact with the workpiece; and moving the rotary tool away from the workpiece.

\* \* \* \* \*